(12) United States Patent
Wong et al.

(10) Patent No.: US 9,690,322 B1
(45) Date of Patent: Jun. 27, 2017

(54) ELECTRONIC DEVICE HAVING CIRCUIT BOARD AS CHASSIS

(71) Applicant: INTEL CORPORATION, Santa Clara, CA (US)

(72) Inventors: Hong W. Wong, Portland, OR (US); Wah Yiu Kwong, Hillsboro, OR (US); Timothy T. Nguyen, Portland, OR (US); Johnson Tao, Shanghai (CN); Xiaoguo Liang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/979,320

(22) Filed: Dec. 22, 2015

(51) Int. Cl.
*G06F 1/16* (2006.01)
*H05K 7/16* (2006.01)
*H05K 5/02* (2006.01)
*H05K 7/14* (2006.01)
*G06F 1/18* (2006.01)

(52) U.S. Cl.
CPC ............ *G06F 1/1616* (2013.01); *G06F 1/163* (2013.01); *G06F 1/1637* (2013.01); *G06F 1/1681* (2013.01); *G06F 1/182* (2013.01); *G06F 1/183* (2013.01); *H05K 5/0239* (2013.01); *H05K 7/1427* (2013.01); *H05K 7/16* (2013.01)

(58) Field of Classification Search
CPC ...... G06F 1/1615; G06F 1/1616; G06F 1/163; G06F 1/183; G06F 1/184; G06F 1/182; H05K 7/1429
USPC ........................... 361/679.55, 679.56, 679.03
See application file for complete search history.

(56) References Cited

U.S. PATENT DOCUMENTS

| | | | | |
|---|---|---|---|---|
| 5,132,876 A | * | 7/1992 | Ma ........................ | G06F 1/1616 361/679.09 |
| 6,820,330 B1 | * | 11/2004 | Haba ...................... | H05K 3/445 29/825 |
| 2002/0117315 A1 | * | 8/2002 | Gabower ................ | B29C 51/10 174/377 |
| 2003/0106724 A1 | * | 6/2003 | Masamitsu ........... | G06F 1/1616 178/18.03 |
| 2012/0194976 A1 | * | 8/2012 | Golko ..................... | G06F 1/163 361/679.01 |
| 2012/0212922 A1 | * | 8/2012 | Schneider ............... | G06F 1/163 361/807 |
| 2014/0160654 A1 | | 6/2014 | Yoo et al. | |
| 2015/0331447 A1 | * | 11/2015 | Hasegawa ............ | H05K 1/0281 361/679.03 |
| 2015/0338879 A1 | * | 11/2015 | Hiramoto ................ | G06F 1/163 361/679.03 |
| 2016/0011709 A1 | * | 1/2016 | Nicolas ................. | G06F 1/3262 345/174 |

(Continued)

FOREIGN PATENT DOCUMENTS

CN    2665817 Y    12/2004
CN    102298421 A    12/2011

(Continued)

*Primary Examiner* — Nidhi Thaker
(74) *Attorney, Agent, or Firm* — KED & Associates LLP (57) ABSTRACT

An electronic device may be provided that includes a first housing. The first housing may include a plurality of electronic components, and a circuit board having a first surface and a second surface. At least one of the electronic components may be provided on the second surface of the circuit board. The circuit board may be configured as a chassis of the first housing.

15 Claims, 7 Drawing Sheets

(56) References Cited

U.S. PATENT DOCUMENTS

| | | | |
|---|---|---|---|
| 2016/0070234 A1* | 3/2016 | Lee | A44C 5/0007 368/282 |
| 2016/0209920 A1* | 7/2016 | Mastandrea | G06F 3/014 |
| 2016/0255733 A1* | 9/2016 | Jung | G06F 1/1633 361/759 |

FOREIGN PATENT DOCUMENTS

| | | |
|---|---|---|
| CN | 203038154 U | 7/2013 |
| WO | WO 2016/049942 A1 | 4/2016 |

* cited by examiner

ELECTRONIC DEVICE HAVING CIRCUIT BOARD AS CHASSIS

BACKGROUND

1. Field

Embodiments may relate to an electronic device having a circuit board as a chassis or a chassis skin.

2. Background

Electronic devices are becoming smaller and smaller. Efforts are made to make electronic devices even thinner while still performing in a proper manner.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

An electronic device may be a mobile terminal, a mobile device, a mobile computing platform, a laptop computer, a tablet, an ultra-mobile personal computer, a mobile Internet device, a smartphone, a personal digital assistant, a television (TV) set, a monitor and/or etc.

Figure 1:
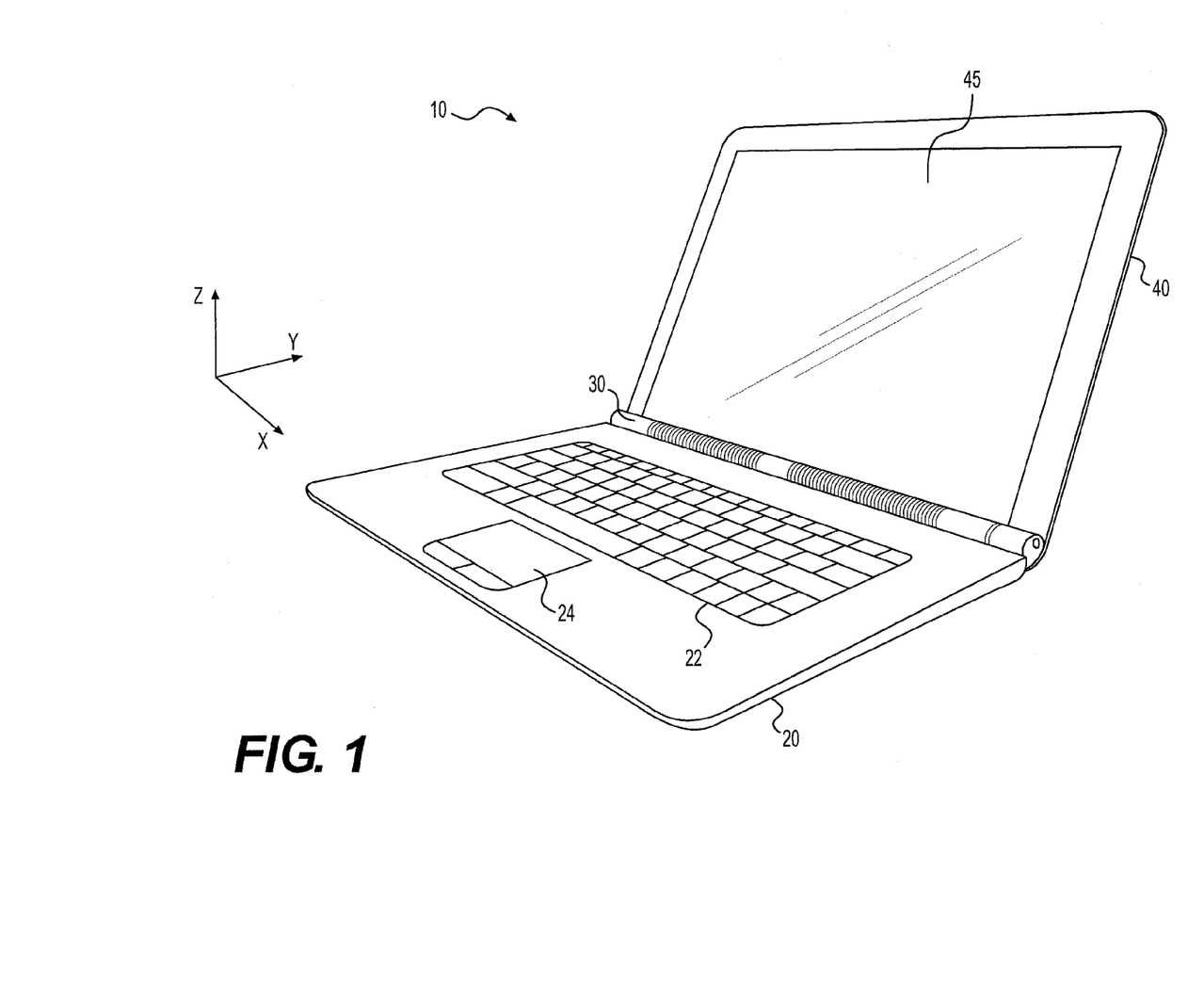
FIG. 1 shows an electronic device according to an example embodiment.

FIG. 1 shows an electronic device according to an example arrangement. Other arrangements may also be provided. For ease of discussion, the following may describe the electronic device (or electronic apparatus) as being a computer system (such as a laptop computer). However, the electronic device may be a different type of device or system.

FIG. 1 shows the electronic device is a computer system 10 such as a laptop computer or notebook computer, for example. The computer system 10 may include a base 20 and a lid 40 that are coupled together by a hinge device 30. The base may be considered a first housing, and the lid may be considered a second housing. The hinge device 30 may couple to the first housing and the second housing. The hinge device 30 may allow the first housing to rotate relative to the second housing.

The base 20 may support a keyboard 22 and a touch pad 24, for example. The base 20 may also internally support various components such as a processor, a memory, a circuit board, a battery, a heat sink, etc. These components may generate heat during operation of the computer 10. The components may be electronic components.

The lid 40 may support a display 45 for a user to view during use of the computer system 10. The lid 40 may support other electric components. The components of the lid 40 may further generate heat during operation of the computer system 10.

Figure 2:
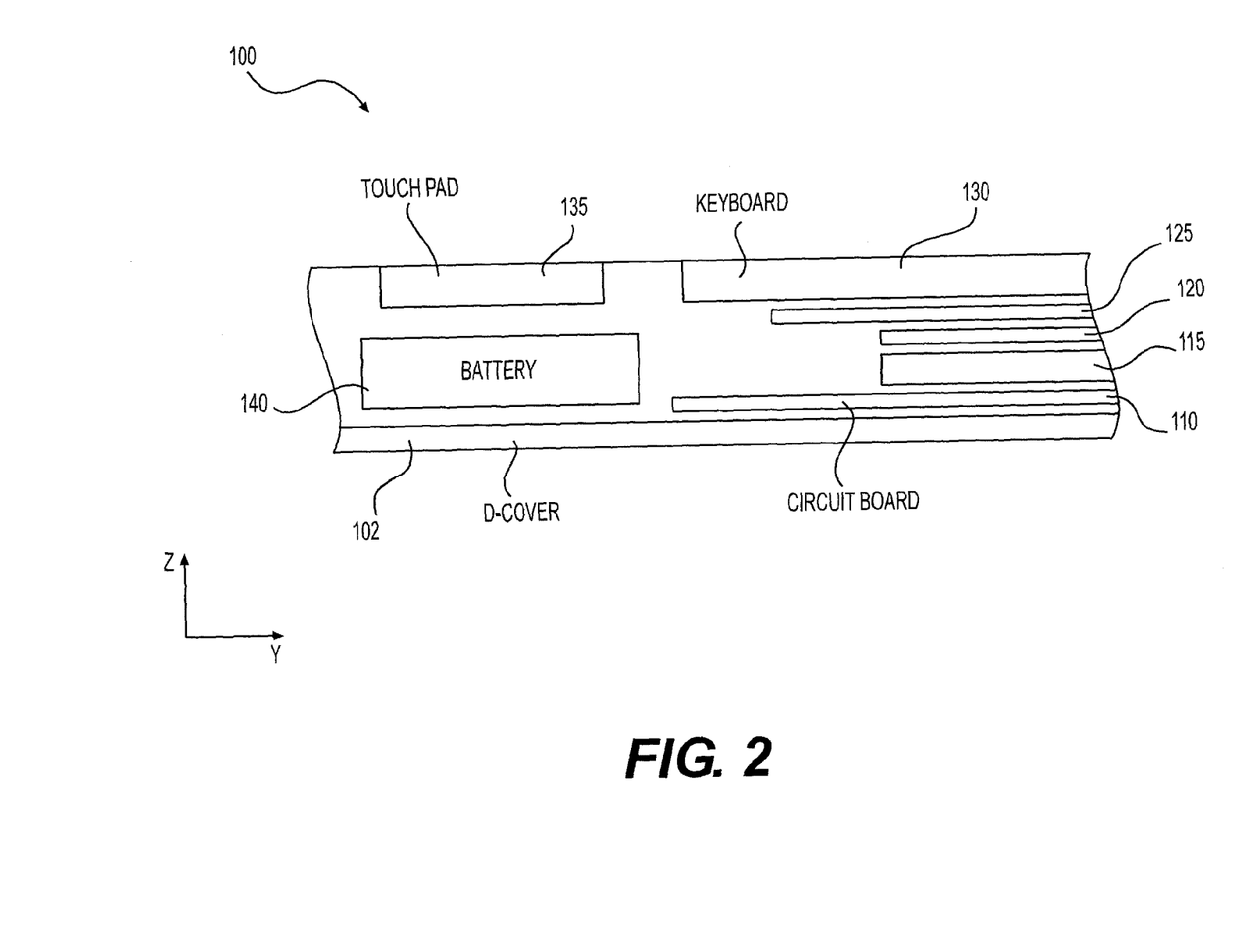
FIG. 2 is a side view of an electronic device according to an example arrangement.

FIG. 2 is a side view of an electronic device according to an example arrangement. Other arrangements may also be provided. For ease of discussion, FIG. 2 shows the side view of a base of a computer system. However, other systems or devices may be used. For example, FIG. 2 may show a side view of a housing of an electronic device or system.

As one example, FIG. 2 shows a side view of the base 20 of the computer system 10 shown in FIG. 1. FIG. 2 shows the components in a stacked configuration 100.

FIG. 2 shows the stacked configuration 100 having a D-cover 102 as a bottom surface (or bottom cover) of the base 20. The D-cover 102 may be provided along an entire bottom surface of the base 20. The D-cover 102 may serve as a bottom surface of the computer system. The D-cover 102 may also be considered a casing, a chassis, a skin and/or a chassis skin. The D-cover 102 may be made of plastic or metal. The D-cover 102 may include an electromagnetic interference (EMI) shielding coating at an inner side of the D-cover 102. This may allow the D-cover 102 to form a side of a Faraday cage for system components. Alternatively, the D-cover may be made of metal in order to even thermal spreading and remove localized hot spots on the D-cover.

Different components may be mounted or attached to the D-cover 102. For ease of illustration, FIG. 2 may show a small space between each of the components in the Z-direction. However, the components may be physically attached or connected to each other in the Z-direction.

FIG. 2 shows a circuit board 110 that may be attached to (or mounted on) the D-cover 102. FIG. 2 also shows a battery 140 or battery port that may be mounted on (or attached to the D-cover 102).

Various electronic components may be mounted on (or attached to) the circuit board 110. For example, FIG. 2 shows a processor 115 mounted on (or attached to) the circuit board 110. In at least one example arrangement, an insulation tape may be physically provided between the D-cover 102 and the circuit board 110.

Heat spreading devices may be provided on the processor 115. For example, FIG. 2 shows a heat pipe 120 mounted on (or attached to) the processor 115, and a heat spreader 125 mounted on (or attached to) the heat pipe 120.

FIG. 2 also shows a keyboard 130 and a touch pad 135 at a top of the base 20. For example, FIG. 2 shows the keyboard 130 mounted on (or attached to) the heat spreader 120. In at least one example arrangement, an air space (or air gap) may be physically provided between the heat spreader 125 and the keyboard 130. The keyboard 130 may correspond to the keyboard 22 shown in FIG. 1.

FIG. 2 shows the touch pad 135 above the battery 140 (or battery port). In at least one arrangement, the touch pad 135 may be physically separated from the battery 140 (or battery port) in the Z-direction. The touch pad 135 of FIG. 2 may correspond to the touch pad 24 shown in FIG. 1.

The stacked configuration 100 (of the base 20) may include the following: the D-cover 102, the circuit board 110 on the D-cover 102, the processor 115 on the circuit board 110, the heat pipe 120 on the processor 115, the heat spreader 125 on the heat pipe 120 and the keyboard 130 on the heat spreader 125. The stacked configuration 100 (of the base 20) may also include the following: the D-cover 102, the battery 140 (or battery port) on the D-cover 102, and the touch pad 135 on (or above) the battery 140 (or battery port). The stacked configuration 100 may include a plurality of components on the D-cover 102, which serves as the bottom surface of the base 20.

Each of the components of the stacked configuration 100 may have a thickness (in the Z-direction). For example, the D-cover 102 may have a thickness of 0.8 mm, the insulation tape may have a thickness of 0.2 mm, the circuit board 110 may have a thickness of 1.0 mm, and the processor 115 may have a thickness of 1.3 mm. Additionally, the heat pipe 120 may have a thickness of 1.0 mm, the heat spreader 125 may have a thickness of 0.8 mm, the air space (between the heat spreader 125 and the keyboard 130) may have a thickness of 0.5 mm, and the keyboard 130 may have a thickness of 3.2 mm. Based on the above data, the stacked configuration 100 shown in FIG. 2 may have an overall thickness of 8.8 mm. The thickness of the stacked configuration 100 may be from a bottom surface of the D-cover 102 to a top surface of the keyboard 130. The stacked configuration 100 may have other overall thicknesses and/or different thicknesses of the individual components and/or different components.

Embodiments may provide a structure in which a circuit board serves as a chassis cover or a bottom surface without the use of a separate D-cover. A bottom surface of the circuit board may structurally be a bottom surface of the overall structure (such as the bottom surface of the base). Embodiments may include a circuit board to structurally form a chassis skin to reduce an overall thickness of a base (or other electronic device). The circuit board may be configured as a chassis of the base (or a first housing).

Figure 3:
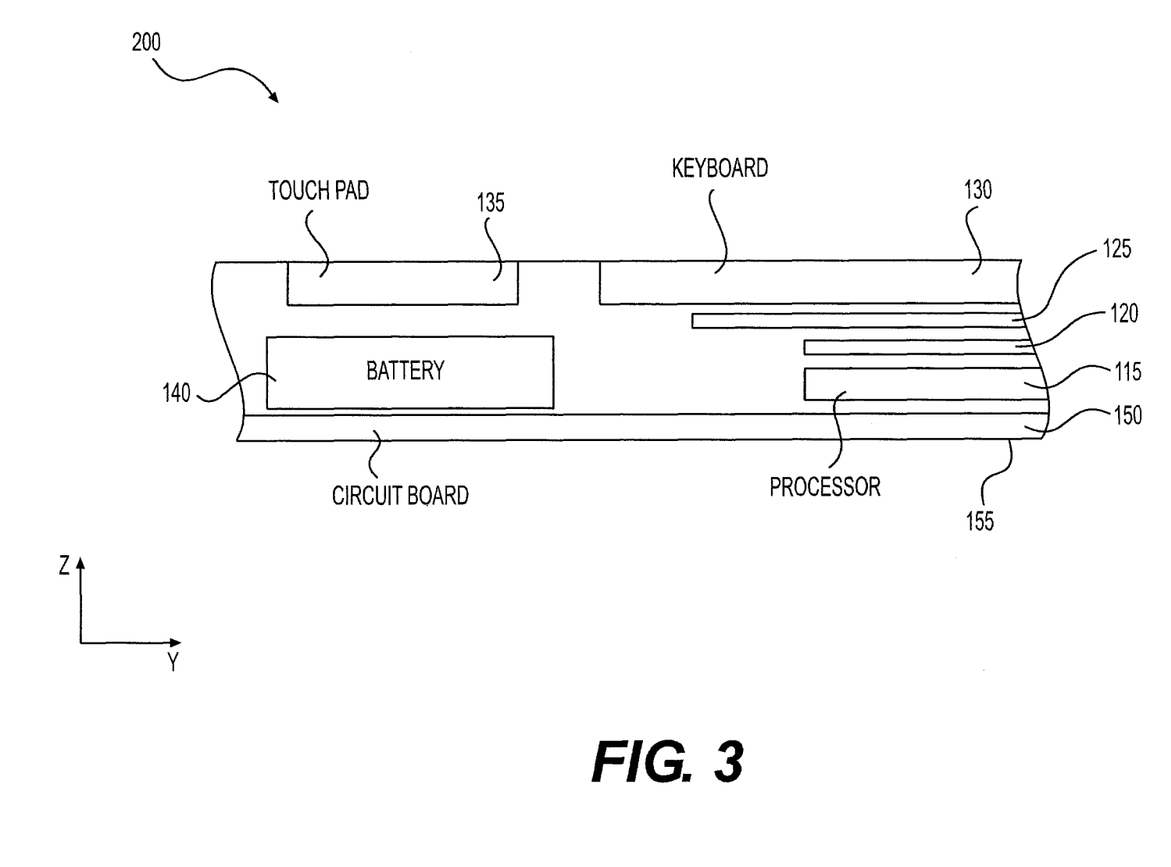
FIG. 3 is a side view of an electronic device according to an example embodiment.

FIG. 3 is a side view of an electronic device according to an example embodiment. Other embodiments and configurations may also be used. For ease of discussion, FIG. 3 shows the side view of a first housing. For example, the first housing may be a base of a computer system. However, other systems or devices may be used.

FIG. 3 shows a side view of a base, such as the base 20 of the computer system shown in FIG. 1 without a separate component as a separate D-cover. FIG. 3 shows the components in a stacked configuration 200 within the first housing, for example. Physical components within the stacked structure may physically contact adjacent components or may be spaced from adjacent components.

FIG. 3 shows the stacked configuration 200 without having a separate D-cover as a bottom surface (or bottom cover) of the base. The circuit board 150 may be provided along an entire bottom surface of the base. FIG. 3 shows that the circuit board 150 having a bottom surface 155 may form (or serve as) a bottom surface of the computer system (or base). The circuit board 150 having the bottom surface 155 may be considered a casing, a chassis, a skin and/or a chassis skin. The bottom surface of the circuit board may structurally be a chassis or chassis skin of the first housing. The circuit board 150 is configured as a chassis of the first housing (or base).

The circuit board 150 may be a mixture of plastic and fiberglass resin. The bottom surface 155 of the circuit board may be coated by a metal outer layer (or metalized outer layer) for aesthetic and mechanical purposes. The metal outer layer may be provided by a materialization process. The coated bottom surface 155 may have increased gloss and reflectivity, abrasion resistance, and electric conductivity.

Methods to provide the metalized layer (or metal outer layer) may include vacuum metallization, arc and flame spraying, plating and/or etc. A physical vapor deposition (PVD) metallization coating on the bottom surface 155 of the circuit board 150 may change the look and feel of the plastic layer so as to look as a metalized coating surface. The use of the bottom surface 155 of the circuit board 150 may reduce the overall thickness by at least 1 millimeter. This may lower system cost, and simplify the assembly process in product manufacturing.

In at least one example, the metal outer layer may be include titanium nitride, zirconium nitride, titanium carbonitride, chromium nitride, aluminum titanium nitride, aluminum titanium chromium carbonitride, titanium aluminum nitride and titanium diboride. Other materials may also be used for the metal outer layer.

Additionally, EMI shielding may be achieved by including a ground layer on the circuit board and by also using the metal coating (or thin metal outer layer). Still further, issues regarding skin temperature may be reduced by using a low power processor.

The metal outer layer (or metalized outer layer) may be provided on the bottom surface 155 of the circuit board 150 (such as on the bottom of the first housing). The metal outer layer may be only a few microns thick. For example, the metal outer layer may have a thickness of approximately 10 microns.

Different components may be mounted or attached to the circuit board 150. For ease of illustration, FIG. 3 shows a small space between each of the components in the Z-direction. However, the components may be physically attached or connected to each other in the Z-direction.

For example, FIG. 3 shows the processor 115 mounted on (or attached to) the circuit board 150.

The battery 140 or battery port may also be provided on the circuit board 150. The battery may be assembled into a battery pack, which may have a cable and/or connector to allow the battery pack to be connected to a motherboard (or the circuit board). The battery pack may also include contact points or terminals for directly contacting a connector at the circuit board.

Heat spreading devices may be provided on the processor 115. For example, FIG. 3 shows the heat pipe 120 mounted on (or attached to) the processor 115, and the heat spreader 125 mounted on (or attached to) the heat pipe 120.

FIG. 3 also shows the keyboard 130 and the touch pad 135 at top of the base (or a top of the first housing). For example, FIG. 3 shows the keyboard 130 mounted on (or attached to) the heat spreader 120. In at least one example embodiment, an air space (or air gap) may be provided between the heat spreader 125 and the keyboard 130. The keyboard 130 may correspond to the keyboard 22 shown in FIG. 1.

FIG. 3 shows the touch pad 135 above the battery 140 (or battery port). In at least one embodiment, the touch pad 135 may be physically separated from the battery 140 (or battery port) in the Z-direction. The touch pad 135 of FIG. 3 may correspond to the touch pad 135 shown in FIG. 1.

Each of the components of the stacked configuration 200 may have a thickness (in the Z-direction). For example, the circuit board 150 may have a thickness of 1.0 mm, and the processor 115 may have a thickness of 1.3 mm. Additionally, the heat pipe 120 may have a thickness of 1.0 mm, the heat spreader 125 may have a thickness of 0.8 mm, the air gap (between the heat spreader 125 and keyboard 130) may have a thickness of 0.5 mm, and the keyboard 130 may have a thickness of 3.2 mm. Based on the above data, the stacked configuration 200 shown in FIG. 3 may have an overall thickness of 7.8 mm. The thickness of the stacked configuration 200 may be from a bottom surface of the circuit board 150 to a top surface of the keyboard 130. The thickness of the stacked configuration 200 may also be from a bottom surface of a metal outer layer (on the circuit board 150) to a top surface of the keyboard 130. The stacked configuration 200 may have other overall thicknesses and/or different thicknesses of the individual components and/or different components.

Based on the above data, the overall thickness (8.8 mm) of the stacked configuration 100 of FIG. 2 (that includes the separate D-cover 102) is greater than the overall thickness (7.8 mm) of the stacked configuration 200 of FIG. 3 (that does not include the separate D-cover 102). The thickness of the stacked configuration 100 is 8.8 mm as compared to the thickness of the stacked configuration 200 of 7.8 mm.

Figure 4A:
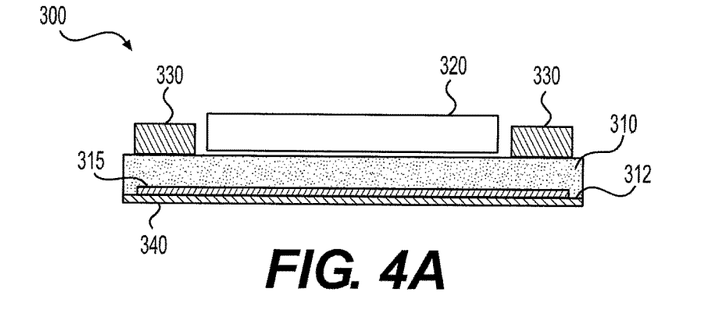
FIG. 4A is a side view of an electronic device according to an example embodiment.

FIG. 4A is a side view of an electronic device according to an example embodiment. Other embodiments and configurations may also be provided. For ease of discussion, FIG. 4A shows the side view of a watch-type electronic device. In at least one embodiment, FIG. 4A may show the side view of a first housing.

As one example, the electronic device shown in FIG. 4A may be a watch-type electronic device 300. The watch-type electronic device 300 may include a circuit board 310, a touchscreen display 320, and electronic components 330 (or at least one electronic component).

The circuit board 310 may be a printed circuit board (PCB) having a plurality of layers. FIG. 4A shows the circuit board 310 includes a shielding layer 315 at one side of the circuit board 310. The shielding layer 315 may be a copper layer for magnetic or electric shielding. The shielding layer 315 may be considered a ground layer. The shielding layer 315 may be considered a part of the circuit board 310 and/or may be considered as one of the layers of the circuit board 310. The circuit board 310 may be configured as a chassis of a housing (such as a base).

FIG. 4A also shows a metal outer layer 340 (or metalized outer layer) on a bottom surface 312 of the circuit board 310. The metal outer layer 340 may be on the shielding layer 315 (of the circuit board 310). In at least one embodiment, the metal outer layer 340 may have a thickness of approximately 10 microns. The metal outer layer 340 may provide electromagnetic interference (EMI) shielding.

The electronic components 330 may be mounted on (or attached to) the circuit board 310. The touchscreen display 320 may be mounted on (or attached to) the circuit board 310. In at least one embodiment, the electronic components 330 may be provided around the touchscreen display 320. For example, the electronic components 330 may be provided in a substantially circular manner (or ring-shape) around the touchscreen display 320. The electronic components 330 may be used to drive the touchscreen display 320 or components of the touchscreen display. Alternatively and/or additionally, element 330 may include one or more physical buttons (or keys) to control the touchscreen display 320 and/or a user input to control the touchscreen display 320. Element 330 may also be used to provide power to the touchscreen display 320 or components of the touchscreen display 320.

Figure 4B:
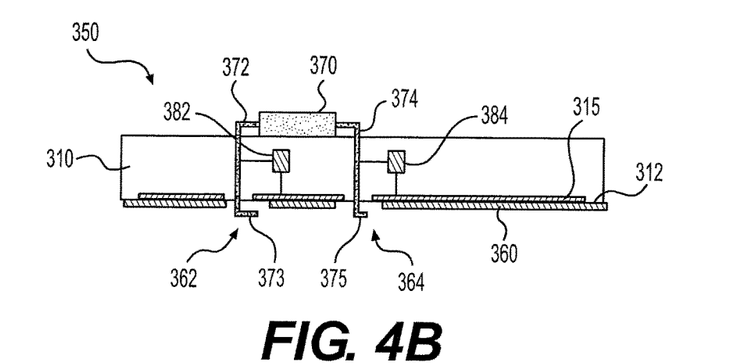
FIG. 4B is a side view of an electronic device according to an example embodiment.

FIG. 4B is a side view of an electronic device according to an example embodiment. Other embodiments and configurations may also be provided. For ease of discussion, FIG. 4B shows the side view of a watch-type electronic device. In at least one embodiment, FIG. 4B may show the side view of a first housing.

As one example, the electronic device shown in FIG. 4B may be a watch-type electronic device 350. The watch-type electronic device 350 may include the circuit board 310, a touchscreen display, and an electronic component 370 (or at least one electronic component).

The circuit board 310 may be a printed circuit board (PCB) having a plurality of layers. FIG. 4B shows the circuit board 310 includes the shielding layer 315 at one side of the circuit board 310. The shielding layer 315 may be a copper layer for magnetic or electric shielding. The shielding layer 315 may be considered a ground layer. The shielding layer 315 may be considered a part of the circuit board 310 and/or may be considered as one of the layers of the circuit board 310. The circuit board 310 may be configured as a chassis of a housing (such as a base).

FIG. 4B also shows a metal outer layer 360 (or metalized outer layer) on the bottom surface 312 of the circuit board 310. The metal outer layer 360 may be on the shielding layer 315 (of the circuit board 310). The metal outer layer 340 may provide electromagnetic interference (EMI) shielding.

FIG. 4B shows the metal outer layer 360 has at least a first opening 362 and a second opening 364. Other numbers of openings (of the metal outer layer) may also be provided. Openings may also be provided within the shielding layer 315.

The electronic component 370 (or at least one electronic component) may be mounted on (or attached to) the circuit board 310. Additionally, the touchscreen display may be mounted on (or attached to) the circuit board 310.

In at least one embodiment, a first conductive line 372 may couple to the electronic component 370 (or at least one electronic component) and extend through the circuit board 310 (and through the shielding layer 315 and the metalized outer layer 360) to a first pad 373 at an end of the first conductive line 372. The first conductive line 372 may pass through the first opening 362 such that first pad 373 may physically contact a user's skin when the watch-type electronic device 350 is on a user's wrist (or arm or hand). The first pad 373 may be formed by bending of the first conductive line 372 or may be a separate component from the first conductive line 373.

In at least one embodiment, a second conductive line 374 may couple to the electronic component 370 (or at least one electronic component) and extend through the circuit board 310 (and through the shielding layer 315 and the metalized outer layer 360) to a second pad 375 at an end of the second conductive line 374. The second conductive line 374 may pass thru the second opening 364 such that the second pad 375 may physically contact a user's skin when the watch-type electronic device 350 is on a user's wrist (or arm or hand). The second pad 375 may be formed by bending of the second conductive line 374 or may be a separate component from the second conductive line 374.

The first and second pads 373 and 375 may be used to contact a user's skin, for example. The first and second pads 373 and 375 may be conductive contacts for body and vital sign sensing. Other numbers of pads and/or openings may also be provided.

FIG. 4B also shows the watch-type electronic device 350 may include a first suppressor 382 and a second suppressor 384. The suppressor may be a transient suppressor. For example, a user's body may carry static charges and may potentially cause damage to electronics (such as inside the watch). The transient suppressor may by-pass the incoming high voltage static charges to the ground and protect the charge from entering the system and damaging the components. All the inputs to the outside may need to be protected by a transient suppressor.

Figure 4C:
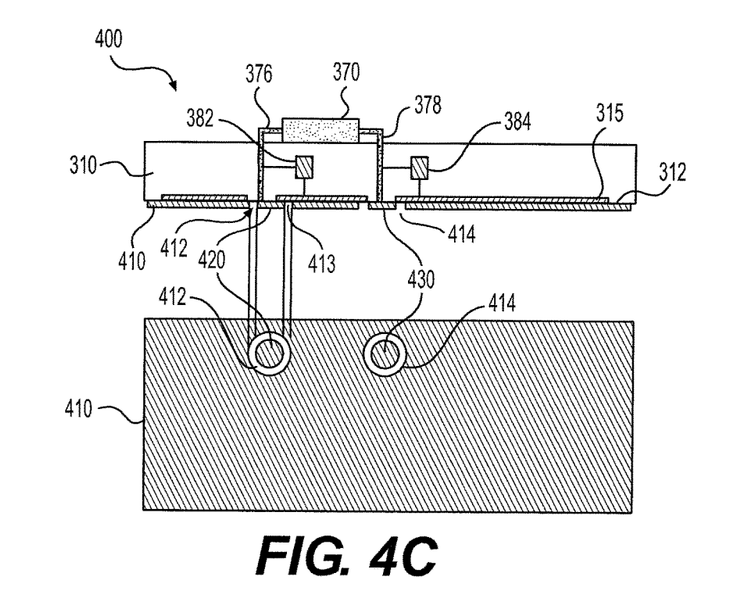
FIG. 4C is a side view and a bottom view of an electronic device according to an example embodiment.

FIG. 4C is a side view and a bottom view of an electronic device according to an example embodiment. Other embodiments and configurations may also be provided. For ease of discussion, FIG. 4C shows the side view of a watch-type electronic device. FIG. 4C may show the side view and bottom view of a first housing.

As one example, the electronic device shown in FIG. 4C may be a watch-type electronic device 400. The watch-type electronic device 400 may include the circuit board 310, a touchscreen display, and the electronic component 370 (or the at least one electronic component).

The circuit board 310 may be a printed circuit board (PCB) having a plurality of layers. FIG. 4C shows the circuit board 310 includes the shielding layer 315 at one side of the circuit board 310. The shielding layer 315 may be a copper layer for magnetic or electric shielding. The shielding layer 315 may be considered a ground layer. The shielding layer 315 may be considered a part of the circuit board 310 and/or may be considered as one of the layers of the circuit board 310. The circuit board 310 may be configured as a chassis of a housing (such as a base).

FIG. 4C also shows a metal outer layer 410 (or metalized outer layer) on the bottom surface 312 of the circuit board 310. The metal outer layer 410 may be on the shielding layer 315 (of the circuit board 310). The metal outer layer 410 may provide electromagnetic interference (EMI) shielding. FIG. 4C shows the metal outer layer 410 has at least a first opening 412 and a second opening 414. The first opening 412 and the second opening 414 may be filled with a non-conductive material. Other numbers of openings (of the metalized outer layer) may also be provided. Openings may also be provided within the shielding layer 315.

In at least one embodiment, the first opening 412 may be a substantially circular opening (or ring-shaped opening) around a first portion 420 (of the metal outer layer 410), and the second opening 414 may be a substantially circular opening (or ring shaped opening) around a second portion 430 (of the metal outer layer 410).

FIG. 4C shows the bottom view of the metal outer layer 410. The bottom view shows the first opening 412 around the first portion 420 and the second opening 414 around the second portion 430. The first portion 420 is surrounded by the non-conductive material in the first opening 412, and the second portion 430 is surrounded by the non-conductive material in the second opening 414.

The electronic component 370 (or at least one electronic component) may be mounted on (or attached to) the circuit board 310. Additionally, the touchscreen display may be mounted on (or attached to) the circuit board 310.

In at least one embodiment, a first conductive line 376 may couple to the electronic component 370 (or at least one electronic component) and extend through the circuit board 310 (and through the shielding layer 315 and the metal outer layer 410) to the first portion 420. In at least one embodiment, a second conductive line 378 may couple to the electronic component 370 (or at least one electronic component) and extend through the circuit board 310 (and through the shielding layer 315 and the metal outer layer 410) to the second portion 430.

The first and second portions 420 and 430 (of the metal outer layer) may make physical contact with a user's skin when the watch-type electronic device 400 is on a user's wrist (or arm or hand). The first and second portions 420 and 430 may be used to contact a user's skin, for example. The first and second portions 420 and 430 may be conductive contacts for body and vital sign sensing. The openings 412, 414 may be filled with the non-conductive material.

Figure 5A:
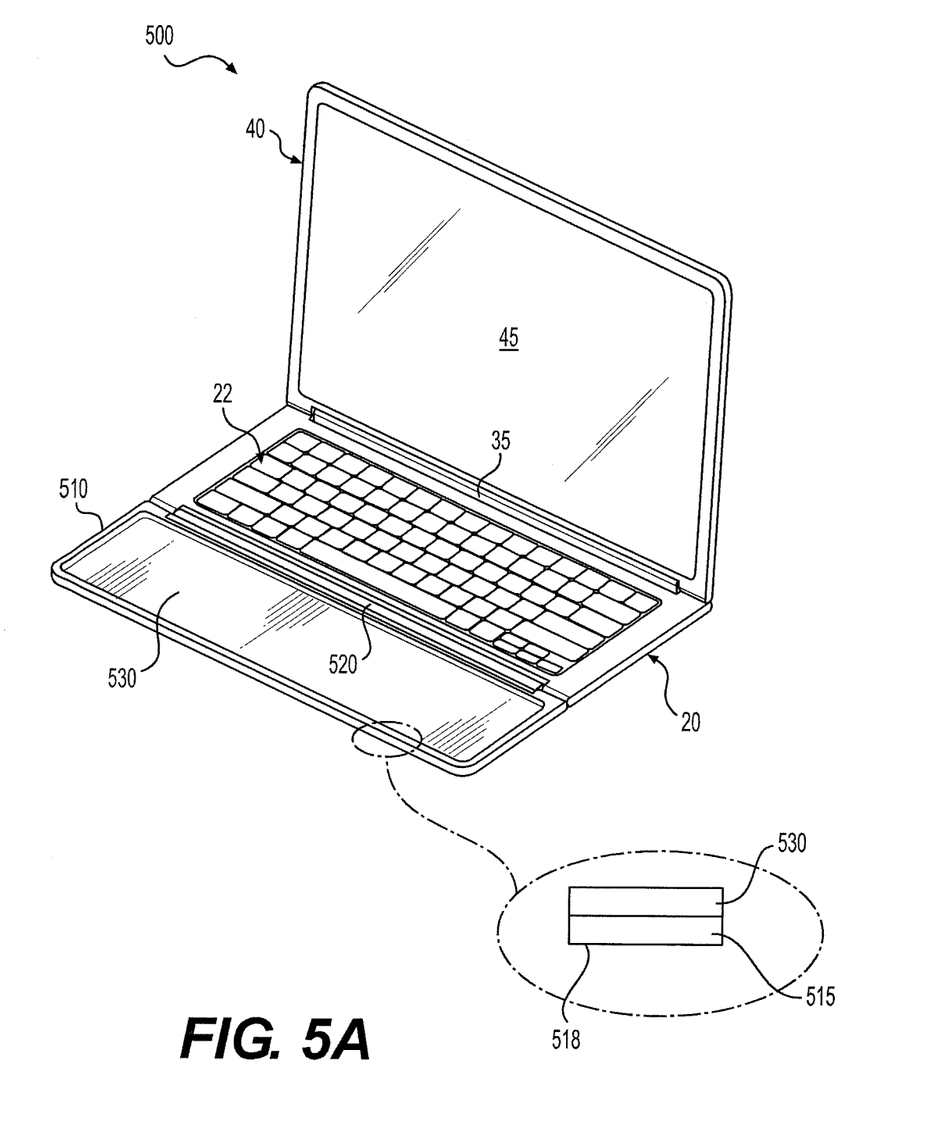
FIGS. 5A, 5B and 5C show an electronic device in various states according to an example embodiment.
Figure 5B:
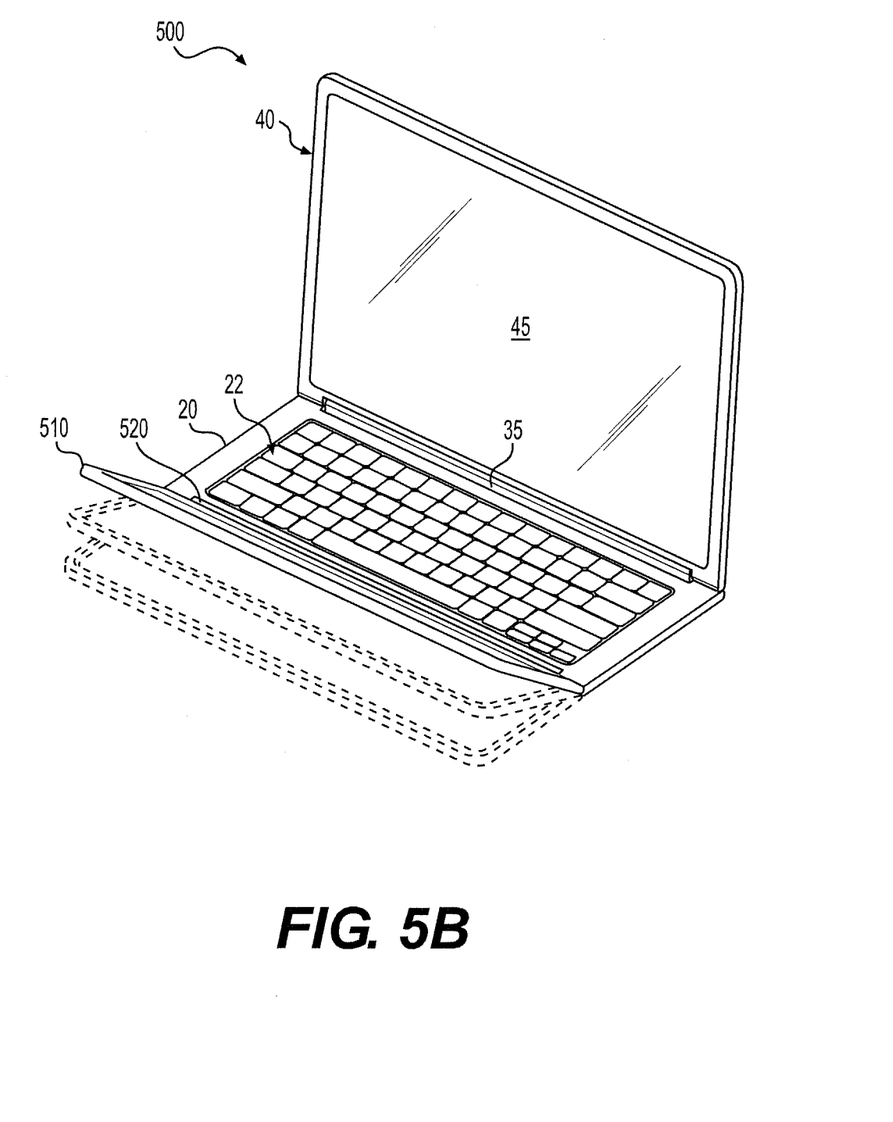
Figure 5C:
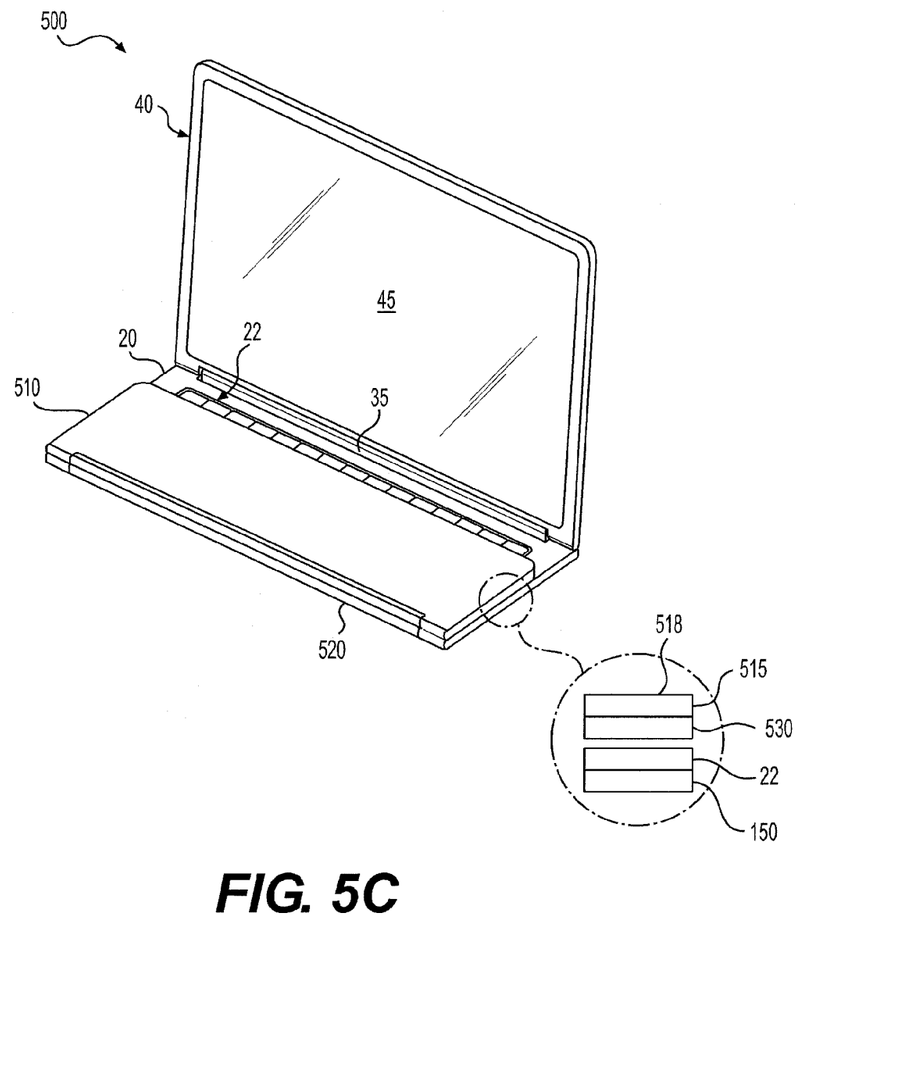

FIGS. 5A, 5B and 5C show an electronic device according to an example embodiment. Other embodiments and configurations may also be provided. For ease of discussion, FIGS. 5A, 5B and 5C show a computer system having a touchpad portion that may rotate onto a keyboard.

FIGS. 5A, 5B and 5C show a computer system 500 that includes the base 20 and the lid 40 that are coupled together by a hinge device 35.

The lid 40 may support the display 45.

The base 20 may support the keyboard 22.

A touchpad portion 510 (or first housing) may be part of the base. The touchpad portion 510 may be coupled to other portions of the base by a hinge device 520. As shown in FIGS. 5A, 5B and 5C, the touchpad portion 510 may rotate about the hinge device 520 to different positions. For example, FIG. 5A shows the touchpad portion 510 includes a touch area 530 that is sensitive to a user's touch. The touch area 530 may be a touch pad that has a large active surface. The touch pad may be a sheet of circuit board with conductors etched into the circuit board. In at least one embodiment, copper traces may be provided within the sheet of circuit board. The copper traces may be routed to a flexible cable, which may then pass through the hinge device 520 to a touch pad controller on the circuit board under the keyboard 22.

In FIG. 5A, the touch area 530 may appear as a top surface of the touchpad portion 510. The touch area 530 may be mounted on (or attached to) a circuit board 515. The circuit board 515 may be provided along the bottom surface of the touchpad portion 510 without a separate D-cover. The circuit board 515 may have a surface 518 that structurally forms or serves as a bottom surface of the touchpad portion 510. Accordingly, the circuit board 510 having the surface 518 may be considered a casing, a chassis, a skin and/or a chassis skin. Additionally, a metal outer layer may be provided on the surface 518 of the circuit board 515. The circuit board may be configured as a chassis of the housing (or the touchpad portion).

FIG. 5B shows the touchpad portion 510 being partially rotated, and FIG. 5C shows the touchpad portion 510 being rotated such that the touch area 530 is adjacent to the keyboard 22. In FIG. 5C, the surface 518 may appear as the top surface of the touchpad portion 510 since the touchpad portion 510 is folded onto the base 20.

In at least one embodiment, the base shown in FIGS. 5A, 5B and 5C may include a stacked configuration similar to the stacked configuration 200 shown in FIG. 3. For example, the base in FIGS. 5A, 5B and 5C may include the circuit board 150 as a casing, a chassis, a skin and a chassis skin, and the keyboard 22 (and other components) may be stacked on the circuit board 150. A metalized outer layer may be provided on the circuit board 150.

The following examples pertain to further embodiments.

Example 1 is an electronic device comprising: a first housing that includes: a plurality of electronic components; and a circuit board having at least a first surface and a second surface, at least one of the electronic components on the second surface of the circuit board, and the circuit board is configured as a chassis of the first housing.

In Example 2, the subject matter of Example 1 can optionally include the first surface of the circuit board is an outer surface of the first housing.

In Example 3, the subject matter of Example 1 can optionally include a metal outer layer on the first surface of the circuit board.

In Example 4, the subject matter of Example 1 and Example 3 can optionally include the metal outer layer has a thickness of approximately 10 microns.

In Example 5, the subject matter of Example 1 and Example 3 can optionally include the metal outer layer to provide electromagnetic interference shielding.

In Example 6, the subject matter of Example 1 and Example 3 can optionally include the metal outer layer includes at least one opening.

In Example 7, the subject matter of Example 1 and Example 6 can optionally include at least one conductive line to couple to at least one of the electronic components, the at least one conductive line to extend through the circuit board to the at least one opening of the metal outer layer.

In Example 8, the subject matter of Example 1 and Example 7 can optionally include a first pad is at one end of the at least one conductive line.

In Example 9, the subject matter of Example 1 and Example 6 can optionally include the at least one opening of the metal outer layer is a ring-shaped opening around a portion of the metal outer layer, the at least one opening to be filled with a non-conductive material.

In Example 10, the subject matter of Example 1 and Example 9 can optionally include at least one conductive line to couple to at least one of the electronic components, the at least one conductive line to extend to the portion of the metal outer layer.

In Example 11, the subject matter of Example 1 can optionally include the plurality of electronic components includes at least a processor.

In Example 12, the subject matter of Example 1 and Example 11 can optionally include the processor is on the second surface of the circuit board.

In Example 13, the subject matter of Example 1 can optionally include the first surface of the circuit board is to be an outer surface of the first housing without a separate D-cover of the first housing.

In Example 14, the subject matter of Example 1 can optionally include a second housing, wherein the first housing is a base and the second housing is a lid.

In Example 15, the subject matter of Example 1 and Example 14 can optionally include a hinge device to couple to the first housing and the second housing, the hinge device to allow the first housing to rotate relative to the second housing.

In Example 16, the subject matter of Example 1 can optionally include the circuit board includes a shielding layer at the first surface of the circuit board.

In Example 17, the subject matter of Example 1 can optionally include the plurality of electronic components includes a touch pad at an area on the second surface of the circuit board.

Example 18 is an electronic system comprising: a first housing that includes: a plurality of electronic components, and a circuit board having a first surface and a second surface, at least one of the electronic components on the second surface of the circuit board, and the circuit board is configured as a chassis of the first housing; a second housing that includes a display; and a hinge device to couple to the first housing and to the second housing.

In Example 19, the subject matter of Example 18 can optionally include the first surface of the circuit board is an outer surface of the first housing.

In Example 20, the subject matter of Example 18 can optionally include a metal outer layer on the first surface of the circuit board.

In Example 21, the subject matter of Example 18 and Example 20 can optionally include the metal outer layer has a thickness of approximately 10 microns.

In Example 22, the subject matter of Example 18 and Example 20 can optionally include the metal outer layer to provide electromagnetic interference shielding.

In Example 23, the subject matter of Example 18 and Example 20 can optionally include the metal outer layer includes at least one opening.

In Example 24, the subject matter of Example 18 and Example 23 can optionally include at least one conductive line to couple to at least one of the electronic components, the at least one conductive line to extend through the circuit board to the at least one opening of the metal outer layer.

In Example 25, the subject matter of Example 18 and Example 24 can optionally include a first pad is at one end of the at least one conductive line.

In Example 26, the subject matter of Example 18 and Example 23 can optionally include the at least one opening of the metal outer layer is a ring-shaped opening around a portion of the metal outer layer, the at least one opening to be filled with a non-conductive material.

In Example 27, the subject matter of Example 18 and Example 26 can optionally include at least one conductive line to couple to at least one of the electronic components, the at least one conductive line to extend to the portion of the metal outer layer.

In Example 28, the subject matter of Example 18 can optionally include the plurality of electronic components includes at least a processor.

In Example 29, the subject matter of Example 18 and Example 19 can optionally include the processor is on the second surface of the circuit board.

In Example 30, the subject matter of Example 18 can optionally include the first surface of the circuit board is to be an outer surface of the first housing without a separate D-cover of the first housing.

In Example 31, the subject matter of Example 18 can optionally include the first housing is a base, and the second housing is a lid.

In Example 32, the subject matter of Example 18 can optionally include the circuit board includes a shielding layer at the first surface of the circuit board.

In Example 33, the subject matter of Example 18 can optionally include the plurality of electronic components includes a touch pad at an area on the second surface of the circuit board.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
    a first housing that includes:
        a plurality of electronic components;
        a circuit board having at least a first surface and a second surface, at least one of the electronic components on the second surface of the circuit board, and the circuit board is configured as a chassis of the first housing; and
        a metal outer layer on the first surface of the circuit board, wherein the metal outer layer includes at least one opening, wherein the at least one opening of the metal outer layer is a ring-shaped opening around a portion of the metal outer layer, wherein a non-conductive material to be provided at the at least one opening.

2. The electronic device of claim 1, wherein the first surface of the circuit board is an outer surface of the first housing.

3. The electronic device of claim 1, wherein the metal outer layer has a thickness of approximately 10 microns.

4. The electronic device of claim 1, further comprising at least one conductive line to couple to at least one of the electronic components, the at least one conductive line to extend through the circuit board to the at least one opening of the metal outer layer.

5. The electronic device of claim 4, wherein a first pad is at one end of the at least one conductive line.

6. The electronic device of claim 1, further comprising at least one conductive line to couple to at least one of the electronic components, the at least one conductive line to extend to the portion of the metal outer layer.

7. The electronic device of claim 1, wherein the first surface of the circuit board is to be an outer surface of the first housing without a separate D-cover of the first housing.

8. The electronic device of claim 1, further comprising:
    a second housing, wherein the first housing is a base and the second housing is a lid.

9. The electronic device of claim 8, further comprising a hinge device to couple to the first housing and the second housing, the hinge device to allow the first housing to rotate relative to the second housing.

10. The electronic device of claim 1, wherein the circuit board includes a shielding layer at the first surface of the circuit board.

11. An electronic system comprising:
    a first housing that includes:
        a plurality of electronic components,
        a circuit board having a first surface and a second surface, at least one of the electronic components on the second surface of the circuit board, and the circuit board is configured as a chassis of the first housing, and
        a metal outer layer on the first surface of the circuit board, wherein the metal outer layer includes at least one opening, the at least one opening of the metal outer layer is a ring-shaped opening around a portion of the metal outer layer, the at least one opening to be filled with a non-conductive material;
    a second housing that includes a display; and
    a hinge device to couple to the first housing and to the second housing.

12. The electronic system of claim 11, wherein the first surface of the circuit board is an outer surface of the first housing.

13. The electronic system of claim 11, comprising at least one conductive line to couple to at least one of the electronic components, the at least one conductive line to extend through the circuit board to the at least one opening of the metal outer layer.

14. The electronic system of claim 11, further comprising at least one conductive line to couple to at least one of the electronic components, the at least one conductive line to extend to the portion of the metal outer layer.

15. The electronic system of claim 11, wherein the first surface of the circuit board is to be an outer surface of the first housing without a separate D-cover of the first housing.

* * * * *